US010341886B2

(12) United States Patent
Qi et al.

(10) Patent No.: US 10,341,886 B2
(45) Date of Patent: *Jul. 2, 2019

(54) APPARATUS, SYSTEM AND METHOD OF PERFORMING A FINE TIMING MEASUREMENT (FTM) PROCEDURE

(71) Applicant: INTEL IP CORPORATION, Santa Clara, CA (US)

(72) Inventors: Emily H. Qi, Gig Harbor, WA (US); Carlos Cordeiro, Portland, OR (US); Jonathan Segev, Tel Mond (IL)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/120,370

(22) Filed: Sep. 3, 2018

(65) Prior Publication Data
US 2018/0376356 A1 Dec. 27, 2018

Related U.S. Application Data

(63) Continuation of application No. 15/676,110, filed on Aug. 14, 2017, now Pat. No. 10,091,671, which is a
(Continued)

(51) Int. Cl.
*H04W 24/02* (2009.01)
*H04W 24/06* (2009.01)

(52) U.S. Cl.
CPC .................... *H04W 24/02* (2013.01)

(58) Field of Classification Search
CPC .................................................. H04W 24/02
See application file for complete search history.

(56) References Cited

U.S. PATENT DOCUMENTS 7,483,952 B2 1/2009 Light et al.
7,589,726 B2 9/2009 Aholainen et al.
(Continued)

FOREIGN PATENT DOCUMENTS

CN 101064963 10/2007
CN 101112112 1/2008
(Continued)

OTHER PUBLICATIONS

IEEE STD 802.11™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.
(Continued)

*Primary Examiner* — Gbemileke J Onamuti
(74) *Attorney, Agent, or Firm* — Shichrur & Co.

(57) ABSTRACT

Some demonstrative embodiments include apparatuses, systems and/or methods of performing a Time of Flight (ToF) measurement. For example, a first wireless device may include a radio to communicate a discovery frame with a second wireless device, the discovery frame including an initiator indication to indicate whether a sender of the discovery frame is to be an initiator or a responder of a Time of Flight (ToF) measurement procedure, and availability information to indicate a wireless channel and one or more time intervals; and a controller to perform the ToF measurement procedure with the second wireless device over the wireless channel during the one or more time intervals, the controller be either the initiator or responder of the ToF measurement according to the initiator indication.

20 Claims, 6 Drawing Sheets

Related U.S. Application Data continuation of application No. 14/472,409, filed on Aug. 29, 2014, now Pat. No. 9,763,115.

(60) Provisional application No. 62/006,353, filed on Jun. 2, 2014.

(56) References Cited

U.S. PATENT DOCUMENTS

| | | | |
|---|---|---|---|
| 9,763,115 | B2 | 9/2017 | Qi et al. |
| 2006/0089964 | A1 | 4/2006 | Pandey et al. |
| 2013/0080615 | A1 | 3/2013 | Lee et al. |
| 2013/0250931 | A1 | 9/2013 | Abraham et al. |
| 2015/0094103 | A1 | 4/2015 | Wang et al. |
| 2015/0200811 | A1 | 7/2015 | Kasslin et al. |
| 2018/0098231 | A1 | 4/2018 | Qi et al. |

FOREIGN PATENT DOCUMENTS

| | | |
|---|---|---|
| JP | 2016535276 | 11/2016 |
| WO | 2012131631 | 10/2012 |

OTHER PUBLICATIONS

IEEE Std 802.11™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications Amendment 3: Enhancements for Very High Throughput in the 60 GHz Band, Dec. 28, 2012, 628 pages.

Wi-Fi Alliance Technical Committee P2P Task Group, Wi-Fi Peer-to-Peer (P2P) Technical Specification, Version 1.2, Dec. 14, 2011, 160 pages.

Wireless Gigabit Alliance (WGA) Specifications, WiGig MAC and PHY Specification Version 1.1, Apr. 2011—Final Specification, 442 pages.

International Search Report and Written Opinion for PCT/US2015/033439, dated Sep. 2, 2015, 11 pages.

International Preliminary Report on Patentability for PCT/US2015/033439, dated Dec. 15, 2016, 8 pages.

Office Action for U.S. Appl. No. 14/472,409, dated Jan. 9, 2017, 21 pages.

Notice of Allowance for U.S. Appl. No. 14/472,409, dated May 5, 2017, 10 pages.

Office Action for Japanese Patent Application No. 2016569807, dated Dec. 19, 2017, 3 pages.

Carlos Aldana, et al., CIDs 46,47,48 Regarding Fine Timing Measurement [online], IEEE 802.11-12-1249-04-000m, インターネット<URL: https://mentor.ieee.org/802.11/dcn/12/11-1249-04-000m-802-11-2012-cid-46-47-48.doc>, Jan. 17, 2013, 19 pages.

Carlos Aldana, et al., Location Related Corrections to Draft 2.7 [online], IEEE 802.11-14/0525r5, インターネッ <URL: https://mentor.ieee.org/802.11/dcn/14/11-14-0525-05-000m-location-related-corrections-to-draft-2-7.doc>, May 15, 2014, 33 pages.

Notice of Allowance for U.S. Appl. No. 15/676,110, dated May 30, 2018, 13 pages.

Office Action for U.S. Appl. No. 15/676,110, dated Jan. 25, 2018, 13 pages.

Office Action for Chinese Patent Application No. 2015800223581, dated Dec. 29, 2018, 6 pages.

APPARATUS, SYSTEM AND METHOD OF PERFORMING A FINE TIMING MEASUREMENT (FTM) PROCEDURE

CROSS REFERENCE

This Application claims the benefit of and priority from U.S. Provisional Patent Application No. 62/006,353 entitled "User station and method of peer-to-peer ranging using fine time measurement", filed Jun. 2, 2014, the entire disclosure of which is incorporated herein by reference.

TECHNICAL FIELD

Embodiments described herein generally relate to performing a Time of Flight (ToF) measurement.

BACKGROUND

Various applications use range information between devices.

The range information may enable, for example, users of the devices to meet new people and/or to use one or more services provided by the devices, e.g., when the devices are in proximity to each other.

The range information may enable, for example, one or more advertisers of services to interact with potential clients based on the range information.

The surge in the number and density of devices connected to the Internet, e.g., Internet of Things (IoT) devices, may increase the need for determining range information between devices.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
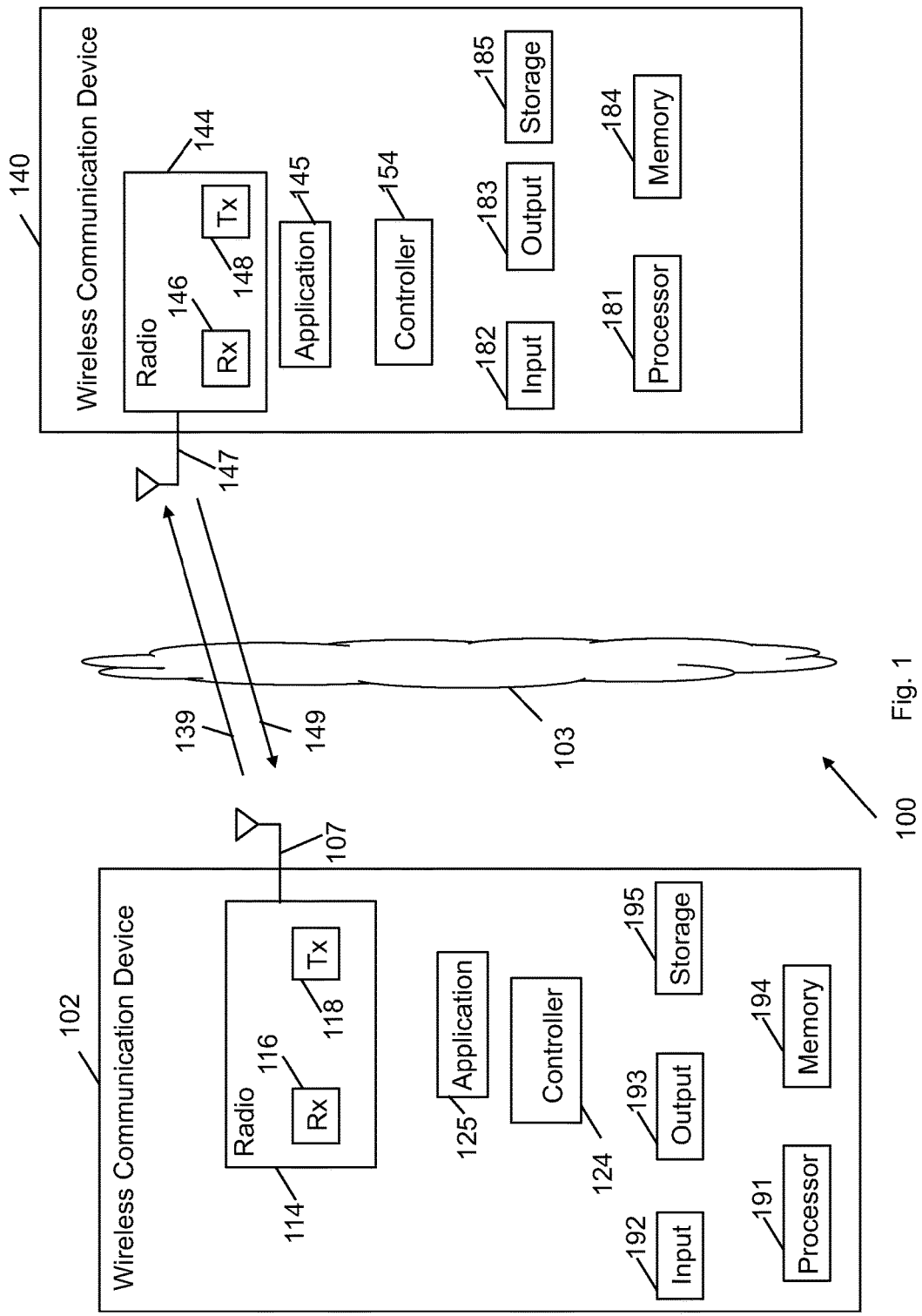
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing Wireless Fidelity (WiFi) Alliance (WFA) Specifications (including WFA Neighbor Awareness Networking (NAN) Specification) and/or future versions and/or derivatives thereof, devices and/or networks operating in accordance with existing Wireless-Gigabit-Alliance (WGA) specifications (Wireless Gigabit Alliance, Inc WiGig MAC and PHY Specification Version 1.1, April 2011, Final specification) and/or future versions and/or derivatives thereof, devices and/or networks operating in accordance with existing IEEE 802.11 standards (IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012; IEEE802.11ac-2013 ("IEEE P802.11ac-2013, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 4: Enhancements for Very High Throughput for Operation in Bands below 6 GHz", December, 2013); IEEE 802.11ad ("IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band", 28 Dec. 2012)) and/or future versions and/or derivatives thereof, devices and/or networks operating in accordance with existing Wireless Fidelity (WiFi) Alliance (WFA) Peer-to-Peer (P2P) specifications (WiFi P2P technical specification, version 1.2, 2012) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

Some demonstrative embodiments may be used in conjunction with a WLAN, e.g., a wireless fidelity (WiFi) network. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 Ghz and 300 GHZ, a WLAN frequency band, a WPAN frequency band, a frequency band according to the WGA specification, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The term "station" (STA), as used herein, may include any logical entity that is a singly addressable instance of a medium access control (MAC) and a physical layer (PHY) interface to a wireless medium (WM).

The phrase "access point" (AP), as used herein, may include an entity that contains one station (STA) and provides access to distribution services, via the WM for associated STAs.

The phrase "non-access-point (non-AP) station (STA)", as used herein, may relate to a STA that is not contained within an AP.

The phrase "peer to peer (PTP or P2P) communication", as used herein, may relate to device-to-device communication over a wireless link ("peer-to-peer link") between a pair of devices. The P2P communication may include, for example, wireless communication over a direct link within a QoS basic service set (BSS), a tunneled direct-link setup (TDLS) link, a STA-to-STA communication in an independent basic service set (IBSS), or the like.

Reference is now made to FIG. 1, which schematically illustrates a block diagram of a system 100, in accordance with some demonstrative embodiments.

As shown in FIG. 1, in some demonstrative embodiments system 100 may include a wireless communication network including one or more wireless communication devices, e.g., wireless communication devices 102 and/or 140.

In some demonstrative embodiments, wireless communication devices 102 and/or 140 may include, for example, a UE, an MD, a STA, an AP, a PC, a desktop computer, a mobile computer, a laptop computer, an Ultrabook™ computer, a notebook computer, a tablet computer, a server computer, a handheld computer, an Internet of Things (IoT) device, a handheld device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, device 102 may include, for example, one or more of a processor 191, an input unit 192, an output unit 193, a memory unit 194, and a storage unit 195; and/or device 140 may include, for example, one or more of a processor 181, an input unit 182, an output unit 183, a memory unit 184, and a storage unit 185. Devices 102 and/or 140 may optionally include other suitable hardware components and/or software components. In some demonstrative embodiments, some or all of the components of one or more of devices 102 and/or 140 may be enclosed in a common housing or packaging, and may be interconnected or operably associated using one or more wired or wireless links. In other embodiments, components of one or more of devices 102 and/or 140 may be distributed among multiple or separate devices.

Processor 191 and/or processor 181 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multipurpose or specific processor or controller. Processor 191 executes instructions, for example, of an Operating System (OS) of device 102 and/or of one or more suitable applications. Processor 181 executes instructions, for example, of an Operating System (OS) of device 140 and/or of one or more suitable applications.

Input unit 192 and/or input unit 182 includes, for example, a keyboard, a keypad, a mouse, a touch-screen, a touch-pad, a track-ball, a stylus, a microphone, or other suitable pointing device or input device. Output unit 193 and/or output unit 183 includes, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

Memory unit 194 and/or memory unit 184 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative embodiments, wireless communication devices 102 and/or 140 may be capable of communicating content, data, information and/or signals via a wireless medium (WM) 103. In some demonstrative embodiments, wireless medium 103 may include, for example, a radio channel, a cellular channel, a Global Navigation Satellite System (GNSS) Channel, an RF channel, a Wireless Fidelity (WiFi) channel, an IR channel, a Bluetooth (BT) channel, and the like.

In some demonstrative embodiments, wireless communication medium 103 may include a wireless communication channel over a 2.4 Gigahertz (GHz) frequency band, or a 5 GHz frequency band, a millimeterWave (mmWave) frequency band, e.g., a 60 GHz frequency band, or any other frequency band.

In some demonstrative embodiments, devices 102 and 140 may include one or more radios to perform wireless communication between devices 102, 140 and/or one or more other wireless communication devices. For example, device 102 may include a radio 114, and/or device 140 may include a radio 144.

In some demonstrative embodiments, radios 114 and/or 144 may include one or more wireless receivers (Rx) to receive wireless communication signals, RF signals, frames, blocks, transmission streams, packets, messages, data items, and/or data. For example, radio 114 may include a receiver 116, and/or radio 144 may include a receiver 146.

In some demonstrative embodiments, radios 114 and/or 144 may include one or more wireless transmitters (Tx) to send wireless communication signals, RF signals, frames, blocks, transmission streams, packets, messages, data items, and/or data. For example, radio 114 may include a transmitter 118, and/or radio 144 may include a transmitter 148.

In some demonstrative embodiments, radios 114 and/or 144 may include modulation elements, demodulation elements, amplifiers, analog to digital and digital to analog converters, filters, and/or the like. For example, radios 114 and/or 144 may include or may be implemented as part of a wireless Network Interface Card (NIC), and the like.

In some demonstrative embodiments, radios 114 and/or 144 may include, or may be associated with, one or more antennas 107 and/or 147, respectively.

In one example, device 102 may include a single antenna 107. In other example, device 102 may include two or more antennas 107.

In one example, device 140 may include a single antenna 147. In other example, device 140 may include two or more antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a phased array antenna, a multiple element antenna, a set of switched beam antennas, and/or the like. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, wireless communication devices 102 and/or 140 may form a wireless local area network (WLAN).

In some demonstrative embodiments, wireless communication devices 102 and/or 140 may form a WiFi network.

In some demonstrative embodiments, wireless communication medium 103 may include a direct link, e.g., a P2P link, for example, to enable direct communication between device 102 and device 140.

In some demonstrative embodiments, wireless communication devices 102 and/or 140 may perform the functionality of WFA P2P devices. For example, device 102 may perform the functionality of a P2P client device, and/or device 140 may perform the functionality of a P2P client device.

In some demonstrative embodiments, wireless communication devices 102 and/or 140 may form a WiFi direct services (WFDS) network.

For example, device 102 may perform the functionality of a service advertiser and/or publisher device, and/or device 140 may perform the functionality of a service seeker and/or subscriber device.

In some demonstrative embodiments, wireless communication devices 102 and/or 140 may form a WiFi Neighbor Awareness Networking (NAN) network.

In other embodiments, wireless communication devices 102 and/or 140 may form any other network.

In some demonstrative embodiments, devices 102 and/or 140 may include NAN devices, which may share a common set of NAN parameters, e.g., including a common time period between consecutive discovery windows, e.g., as described below.

In some demonstrative embodiments, devices 102 and/or 140 may perform the functionality of a NAN client device capable of discovering other NAN devices.

In some demonstrative embodiments, devices 102 and/or 140 may include one or more applications configured to provide and/or to use one or more services and/or applications using the NAN network, e.g., a social application, a file sharing application, a media application and/or the like.

In some demonstrative embodiments, device 102 may include an application 125 to be executed by device 102, and/or device 140 may include an application 145 to be executed by device 140.

In one example, application 124 and/or 145 may include a social application, which may enable interactions between a user of device 102 and a user of device 140 via the NAN network.

In some demonstrative embodiments, application 125 may use range information between devices 102 and 140, for example, to determine if the user of device 140 is in proximity to the user of device 102.

In some demonstrative embodiments, devices 102 and/or 140 may perform a Time of Flight (ToF) measurement procedure to determine the range information between devices 102 and 140.

The ToF may be defined as the overall time a signal propagates from a first station, e.g., device 102, to a second station, e.g., device 140, and back to the first station. A distance between the first and second stations may be determined based on the ToF value, for example, by dividing the ToF value by two and multiplying the result by the speed of light.

In some demonstrative embodiments, devices 102 and 140 may not be able to coordinate the ToF measurement, for example, if both devices 102 and 140 include NAN client devices, e.g., if devices 102 and 140 do not include an AP and/or a NAN master device.

In some demonstrative embodiments, the NAN client devices may be configured to operate at reduced power consumption, and may not be in a power active state for most of the time, e.g., compared to the AP and/or the NAN master. As a result, a coordination of the ToF measurement procedure between NAN client devices may not be the same as coordination between the AP and a NAN client device.

In one example, as opposed to the coordination of the ToF measurement procedure between an AP and one or more devices, in the coordination between NAN client devices, the NAN client devices may not know one or more details to perform the ToF measurement procedure. For example, the NAN client devices may not know which device of the NAN client devices will start the ToF measurement procedure, in which wireless channel and/or band the ToF measurement procedure may be performed, when to start the ToF measurement procedure, and/or how to complete the ToF measurement procedure.

Some demonstrative embodiments may enable devices 102 and 140 to coordinate the ToF measurement procedure, for example, even if devices 102 and 140 includes NAN client devices, e.g., even if devices 102 and 140 do not include an AP and/or a NAN master device.

In some demonstrative embodiments, the ToF measurement procedure may include a Fine Timing Measurement (FTM) procedure.

Figure 2:
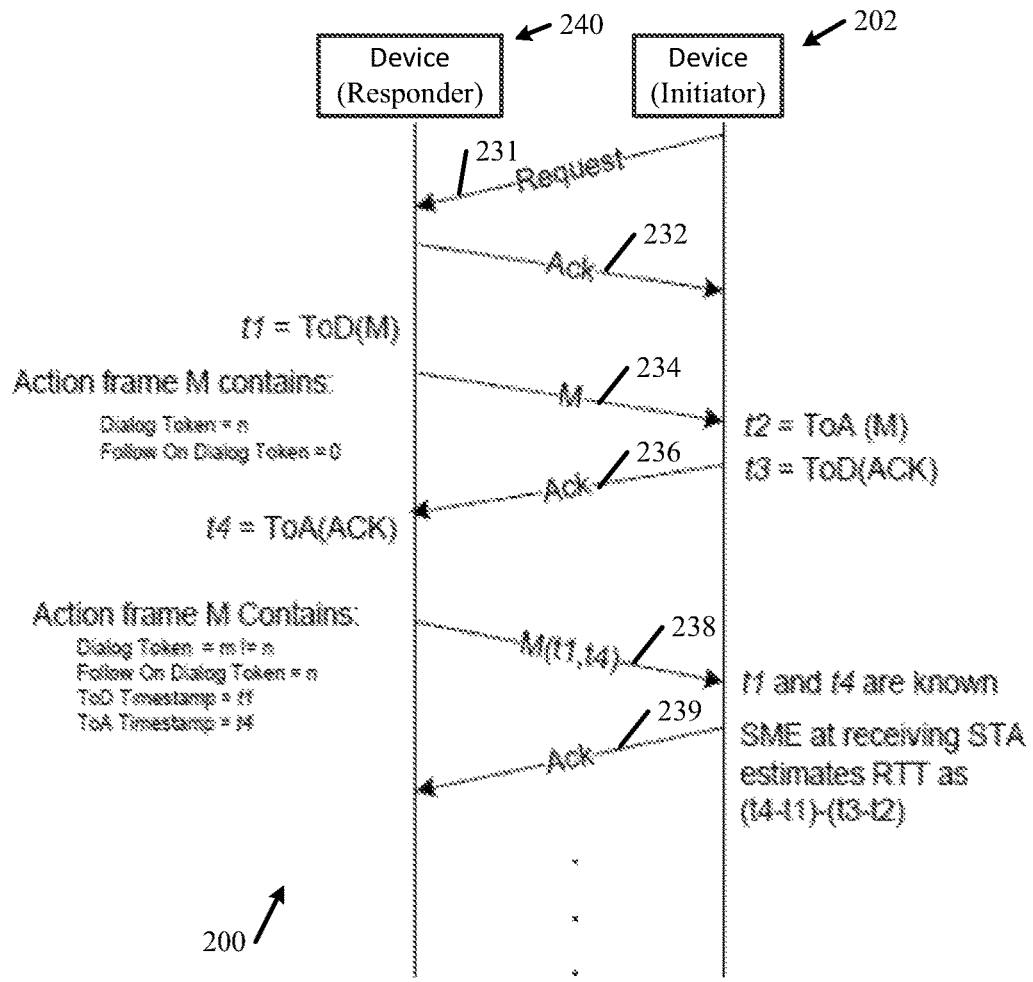
FIG. 2 is a schematic illustration of a Fine Time Measurement (FTM) procedure, in accordance with some demonstrative embodiments.

Reference is made to FIG. 2, which schematically illustrates a sequence diagram, which demonstrates operations and interactions between a first wireless communication device 202 (Initiating STA) and a second wireless communication device 240 (Responding STA), for performing an FTM procedure 200, in accordance with some demonstrative embodiments. For example, device 202 may perform the functionality of device 102 (FIG. 1) and/or device 240 may perform the functionality of device 140 (FIG. 1).

As shown in FIG. 2, device 202 may transmit to device 240 an FTM request message 231 to request to perform the FTM procedure 200 with device 240.

As shown in FIG. 2, device 240 may transmit an FTM request acknowledgement (ACK) 232 to device 202, to acknowledge receipt of the FTM request message 231, and to confirm the request to perform the FTM procedure.

As shown in FIG. 2, device 240 may transmit a message 234 to device 202, at a time, denoted t1. The time t1 may be a Time of Departure (ToD), denoted ToD(M), of message 234.

As shown in FIG. 2, device 202 may receive message 234 and may determine a time, denoted t2, e.g., by determining a Time of Arrival (ToA), denoted ToA(M), of message 234.

As shown in FIG. 2, device 202 may transmit a message 236 to device 240, at a time, denoted t3. Message 236 may include, for example, an acknowledgement message transmitted in response to message 234. The time t3 may be a ToD, denoted ToD(ACK), of the message 236.

As shown in FIG. 2, device 240 may receive message 236 and may determine a time, denoted t4, e.g., by determining a ToA, denoted ToA(ACK), of message 236.

As shown in FIG. 2, device 240 may transmit a message 238 to device 202. Message 238 may include, for example, information corresponding to the time t1 and/or the time t4. For example, message 238 may include a timestamp, e.g., a ToD timestamp, including the time t1, and a timestamp, e.g., a ToA timestamp, including the time t4.

As shown in FIG. 2, device 202 may receive message 238. Device 202 may determine a ToF between device 202 and device 240, for example, based on message 238.

For example, device 202 may determine the ToF based on an average, or any other function, applied to the time values t1, t2, t3 and t4. For example, device 202 may determine the ToF, e.g., as follows:

$$\text{ToF}=[(t4-t1)-(t3-t2)]/2 \quad (1)$$

As shown in FIG. 2, device 202 may transmit a message 239 to device 240. Message 239 may include, for example, an acknowledgement message transmitted in response to message M(t1,t4).

In some demonstrative embodiments, device 202 may determine the distance between devices 202 and 240 based on the calculated ToF.

For example, device 202 may determine the distance, denoted $r_k$, e.g., as follows:

$$r_k = \text{ToF}*C \quad (2)$$

wherein C denotes the radio wave propagation speed.

Referring back to FIG. 1, in some demonstrative embodiments, devices 102 and/or 140 may include a controller configured to perform and/or to coordinate the ToF measurement procedure between devices 102 and 140. For example, device 102 may include a controller 124, and/or device 140 may include a controller 154.

In some demonstrative embodiments, controllers 124 and/or 154 may include circuitry, e.g., processor circuitry, memory circuitry, Media-Access Control (MAC) circuitry, Physical Layer (PHY) circuitry, and/or any other circuitry, configured to perform the functionality of controllers 124 and/or 154. Additionally or alternatively, one or more functionalities of the controllers 124 and/or 154 may be implemented by logic, which may be executed by a machine and/or one or more processors, e.g., as described below.

In some demonstrative embodiments, transmitter 118 may transmit over WM 103 a discovery frame 139 to device 140.

In some demonstrative embodiments, discovery frame 139 may include a NAN service discovery frame, e.g., a NAN service discovery publish frame.

In some demonstrative embodiments, device 102 may be able to perform the functionality of device 140 and vice versa. According to these embodiments, transmitter 148 may transmit discovery frame 139 to device 102.

In some demonstrative embodiments, discovery frame 139 may include an initiator indication to indicate whether device 102 is to be an initiator, e.g., device 202 (FIG. 2), or a responder, e.g., device 240 (FIG. 2), of the ToF measurement procedure, e.g., FTM procedure 200 (FIG. 2).

In some demonstrative embodiments, discovery frame 139 may include availability information of device 102 to indicate a wireless channel and one or more time intervals for performing the ToF measurement procedure.

In some demonstrative embodiments, discovery frame 139 may include capability information of device 102 to indicate whether or not device 102 has at least one capability of an initiator capability, and a responder capability.

In some demonstrative embodiments, discovery frame 139 may include a report indication to indicate whether or not the initiator of the ToF measurement procedure is to send to the responder of the ToF measurement procedure a report of the ToF measurement procedure.

In some demonstrative embodiments, discovery frame 139 may include a ToF measurement information field.

In some demonstrative embodiments, the ToF measurement information field may include a first bit to indicate whether or not device 102 is capable of being the initiator of the ToF measurement procedure. For example, the first bit may be set to "1" to indicate that device 102 is capable of being the initiator of the ToF measurement, or to "0" to indicate that device 102 is not capable of being the initiator of the ToF measurement.

In some demonstrative embodiments, the ToF measurement information field may include a second bit to indicate whether or not device 102 is capable of being the responder of the ToF measurement procedure. For example, the second bit may be set to "1" to indicate that device 102 is capable of being the responder of the ToF measurement, or to "0" to indicate that device 102 is not capable of being the responder of the ToF measurement.

In some demonstrative embodiments, the ToF measurement information field may include a third bit to include the initiator indication. For example, the third bit may be set to "1" to indicate that device 102 is to be the initiator of the ToF measurement, or to "0" to indicate that device 102 is to be the responder of the ToF measurement.

In some demonstrative embodiments, the ToF measurement information field may include a fourth bit to indicate whether or not the initiator of the ToF measurement procedure is to send to the responder of the ToF measurement procedure a report of the ToF measurement procedure. For example, the fourth bit may be set to "1" to indicate that the initiator is to send to the responder the report of the ToF measurement procedure, or to "0" to indicate that the report will not be sent to the responder.

In one example, a BSSID field of the report of the ToF measurement procedure may include a MAC address of the responder, for example, if the fourth bit of the ToF measurement information field is set to "1".

In some demonstrative embodiments, the ToF measurement information field may be included as part of an FTM information attribute, e.g., as follows:

TABLE 1

| Field | Size (octets) | Value | Description |
| --- | --- | --- | --- |
| Attribute ID | 1 | TBD | Identifies the type of NAN attribute. |
| Length | 2 | Variable | Length of the following fields in the attribute. |
| Fine Timing Measurement | 1 | Variable | Bit 0: (Initiator capability): Set to 1 indicates that device is capable to be an Initiator. Otherwise, set to 0. Bit 1: (Responder capability): Set to 1 indicates that device is capable to be a Responder. Otherwise, set to 0. Bit 2 (Initiator preference): Set to 1 indicates that the Device is an Initiator. Otherwise, the Device is a Responder. Bit 3 (Ranging data): Set to 1 indicates that the Initiator will transmit FTM Ranging report to the Responder. Otherwise, no Ranging data report is transmitted afterward. Bit 4-7: Reserved. |

In some demonstrative embodiments, the FTM information attribute may be transmitted in discovery frame 139, for example, based on an indication to perform the ToF measurement procedure.

In one example, the indication to perform the ToF measurement procedure may be communicated as part of a NAN ranging attribute.

In some demonstrative embodiments, the indication to perform the ToF measurement procedure may be included in a field of the ranging attribute, for example, in a ranging protocol field of the ranging attribute.

In some demonstrative embodiments, the ranging protocol field may be set to an FTM value, e.g., a value of "0", for example, to indicate that the ToF measurement procedure is to be performed.

In other embodiments, the ToF measurement information field may be communicated as part of any other frame and/or message, e.g., as part of a dedicated frame or message, or as a field in another frame or message.

In some demonstrative embodiments, discovery frame 139 may include an unsolicited publish frame.

In some demonstrative embodiments, receiver 146 may receive discovery frame 139.

In some demonstrative embodiments, controllers 124 and/or 154 may coordinate the ToF measurement procedure, for example, based on discovery frame 139.

In some demonstrative embodiments, controllers 124 and/or 154 may perform the ToF measurement procedure between devices 102 and/140 over the wireless channel and during the one or more time intervals, which are specified in the availability information of device 102, as indicated by the ToF measurement information field of discovery frame 139.

In some demonstrative embodiments, controller 124 may be either the initiator or responder of the ToF measurement, e.g., according to the initiator indication in discovery frame 139. For example, controller 124 may be the initiator, for example, if the third bit of the ToF measurement information field is set to "1".

In some demonstrative embodiments, controller 154 may be either the initiator or responder of the ToF measurement, e.g., according to the initiator indication in discovery frame 139. For example, controller 154 may be the responder, for example, if the third bit of the ToF measurement information field is set to "1", e.g., controller 154 may perform a role opposite to the role of controller 124.

In some demonstrative embodiments, discovery frame 139 may be a solicited publish frame, e.g., as described below.

In some demonstrative embodiments, transmitter 148 may transmit to device 102 a subscribe frame 149.

In some demonstrative embodiments, subscribe frame 149 may include a discovery frame, e.g., a NAN service discovery subscribe frame.

In some demonstrative embodiments, transmitter 118 may transmit discovery frame 139 in the form of the solicited publish frame, e.g., in response to subscribe frame 149.

In some demonstrative embodiments, subscribe frame 149 may include preference information to indicate a preference of device 140 to be an initiator, e.g., device 202 (FIG. 2), or a responder, e.g., device 240 (FIG. 2), of the ToF measurement procedure, e.g., FTM procedure 200 (FIG. 2).

In some demonstrative embodiments, subscribe frame 149 may include availability information of device 140 to indicate a wireless channel and one or more time intervals for performing the ToF measurement procedure.

In some demonstrative embodiments, subscribe frame 149 may include capability information of device 140 to indicate whether or not device 140 has at least one capability of an initiator capability, and a responder capability.

In some demonstrative embodiments, subscribe frame 149 may include a report indication to indicate whether or not the initiator of the ToF measurement procedure is to send to the responder of the ToF measurement procedure a report of the ToF measurement procedure.

In some demonstrative embodiments, subscribe frame 149 may include a ToF measurement information field.

In some demonstrative embodiments, the ToF measurement information field of subscribe frame 149 may include a first bit to indicate whether or not device 140 is capable of being the initiator of the ToF measurement procedure. For example, the first bit may be set to "1" to indicate that device 140 is capable of being the initiator of the ToF measurement, or to "0" to indicate that device 140 is not capable of being the initiator of the ToF measurement.

In some demonstrative embodiments, the ToF measurement information field of subscribe frame 149 may include a second bit to indicate whether or not device 140 is capable of being the responder of the ToF measurement procedure. For example, the second bit may be set to "1" to indicate that device 140 is capable of being the responder of the ToF measurement, or to "0" to indicate that device 140 is not capable of being the responder of the ToF measurement.

In some demonstrative embodiments, the ToF measurement information field of subscribe frame 149 may include a third bit to indicate the preference information. For example, the third bit may be set to "1" to indicate that device 140 prefers to be the initiator of the ToF measurement, or to "0" to indicate that device 140 prefers to be the responder of the ToF measurement.

In some demonstrative embodiments, the ToF measurement information field of subscribe frame 149 may include a fourth bit to indicate whether or not the initiator of the ToF measurement procedure is to send to the responder of the ToF measurement procedure a report of the ToF measurement procedure. For example, the fourth bit may be set to "1" to indicate that the initiator is to send to the responder the report of the ToF measurement procedure, or to "0" to indicate that no report will be sent to the responder.

In some demonstrative embodiments, the ToF measurement information field of subscribe frame 149 may be included as part of an FTM information attribute, e.g., as describe above with reference to Table 1.

In some demonstrative embodiments, receiver 116 may receive subscribe frame 149 from device 140.

In some demonstrative embodiments, controller 124 may determine one or more parameters of discovery frame 139 based on subscribe frame 149.

In some demonstrative embodiments, controller 124 may determine the wireless channel and the time intervals of the availability information in discovery frame 139, for example, based on the availability information of device 140 in subscribe frame 149.

In some demonstrative embodiments, controller 124 may determine the initiator indication in discovery frame 139, for example, based on the capability information of device 140 in subscribe frame 149 and/or the capability information of device 102.

In one example, controller 124 may determine device 102 to be the initiator, for example, if device 140 does not have the initiator capability, and device 102 has the initiator capability.

In another example, controller 124 may determine device 102 to be the initiator, for example, if both devices 102 and/or 140 have the initiator capability.

In another example, controller 124 may determine device 140 to be the initiator, for example, if device 102 does not have the initiator capability, and device 140 has the initiator capability.

In some demonstrative embodiments, receiver 146 may receive discovery frame 139 in the form of the solicited publish frame, e.g., in response to subscribe frame 149.

In some demonstrative embodiments, controllers 124 and/or 154 may perform the ToF measurement procedure between devices 102 and/140 over the wireless channel based on discovery frame 139.

In some demonstrative embodiments, device 140 may transmit subscribe frame 149 in response to discovery frame 139, for example, if discovery frame 139 includes the unsolicited publish frame.

In some demonstrative embodiments, subscribe frame 149 may be in response to discovery frame 139, for example, if device 140 is not capable to comply with one or more requirements specified in discovery frame 139.

In one example, device 140 may transmit subscribe frame 149, for example, if device 140 cannot comply with the availability information of device 102, e.g., the wireless channel and/or the one or more time intervals indicated in discovery frame 139.

In another example, device 140 may transmit subscribe frame 149, for example, if device 140 cannot comply with the initiator indication of discovery frame 139, e.g., if the initiator indication indicates device 140 to be the responder, and device 140 does not have the responder capability.

In some demonstrative embodiments, device 140 may not perform the ToF measurement procedure, for example, if device 140 is not capable of complying with the one or more requirements specified in discovery frame 139.

In some demonstrative embodiments, the coordination of the ToF measurement procedure, e.g., using discovery frame 139 and/or subscribe frame 149, may enable performing an FTM measurement between two NAN client devices, e.g., as describe above.

Figure 3:
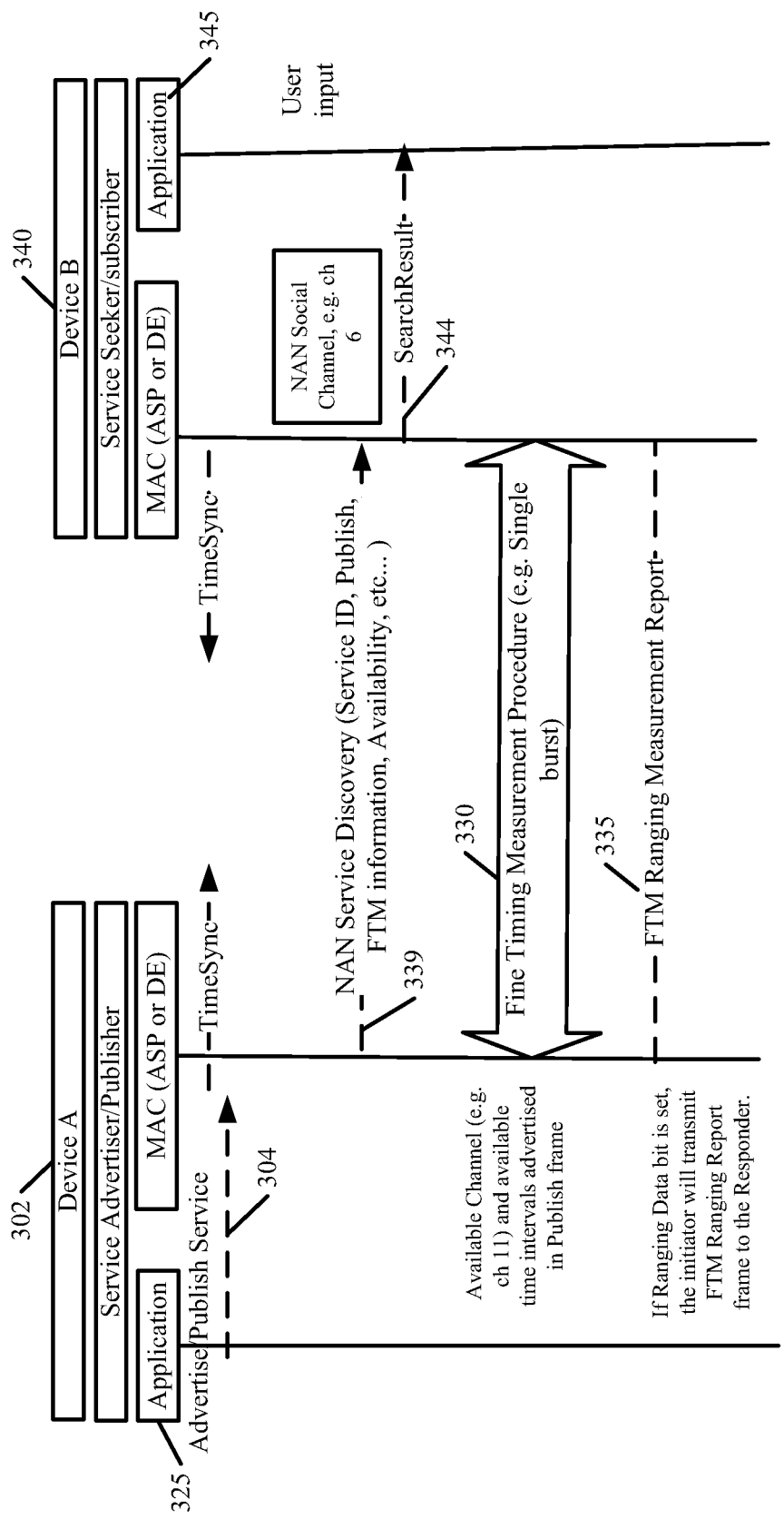
FIG. 3 is a sequence diagram of operations between a first wireless communication device and a second wireless communication device, in accordance with some demonstrative embodiments.

Reference is made to FIG. 3, which schematically illustrates a sequence 300 of operations between a first wireless communication device 302 and a second wireless communication device 340, in accordance with some demonstrative embodiments. For example, device 302 may perform the functionality of device 102 (FIG. 1) and/or device 340 may perform the functionality of device 140 (FIG. 1).

In some demonstrative embodiments, sequence 300 may include communication of an unsolicited publish frame, e.g., as described below.

As shown in FIG. 3, device 302 may include an application 325, and/or device 340 may include an application 345. For example, application 325 may perform the functionality of application 125 (FIG. 1), and/or application 345 may perform the functionality of application 145 (FIG. 1).

As shown in FIG. 3, application 325 may advertise and/or publish (304) a service, which requires performing the FTM procedure. For example, application 325 may interact with a user of application 345, e.g., if the user is in proximity to device 302.

As shown in FIG. 3, device 302 may transmit a NAN service discovery frame 339. For example, NAN service discovery frame 339 may perform the functionality of discovery frame 139 (FIG. 1).

As shown in FIG. 3, NAN service discovery frame 339 may include an unsolicited publish frame.

As shown in FIG. 3, NAN service discovery frame 339 may include a service ID of the service, the ToF measurement information field, the availability information of device 302, and/or any other information relating to the service and/or to the FTM measurement.

As shown in FIG. 3, device 340 may receive NAN service discovery frame 339, and may notify (344) application 345.

As shown in FIG. 3, after NAN service discovery frame 339 is received by device 340, devices 302 and/or 340 may perform an FTM procedure 330. For example, FTM procedure 330 may perform the functionality of FTM procedure 200 (FIG. 2).

In some demonstrative embodiments, devices 302 and/or 340 may perform FTM procedure 330, for example, according to the information in NAN service discovery frame 339, e.g., using available channel 11, the time intervals in the availability information and/or the like.

As shown in FIG. 3, once FTM procedure 330 is complete, the initiator of FTM procedure 330, e.g., as determined in the initiator indication of NAN service discovery frame 339, may communicate an FTM raging measurement report 335 with the responder, for example, if the report indication indicates the initiator is to send the FTM raging measurement report 335.

Figure 4:
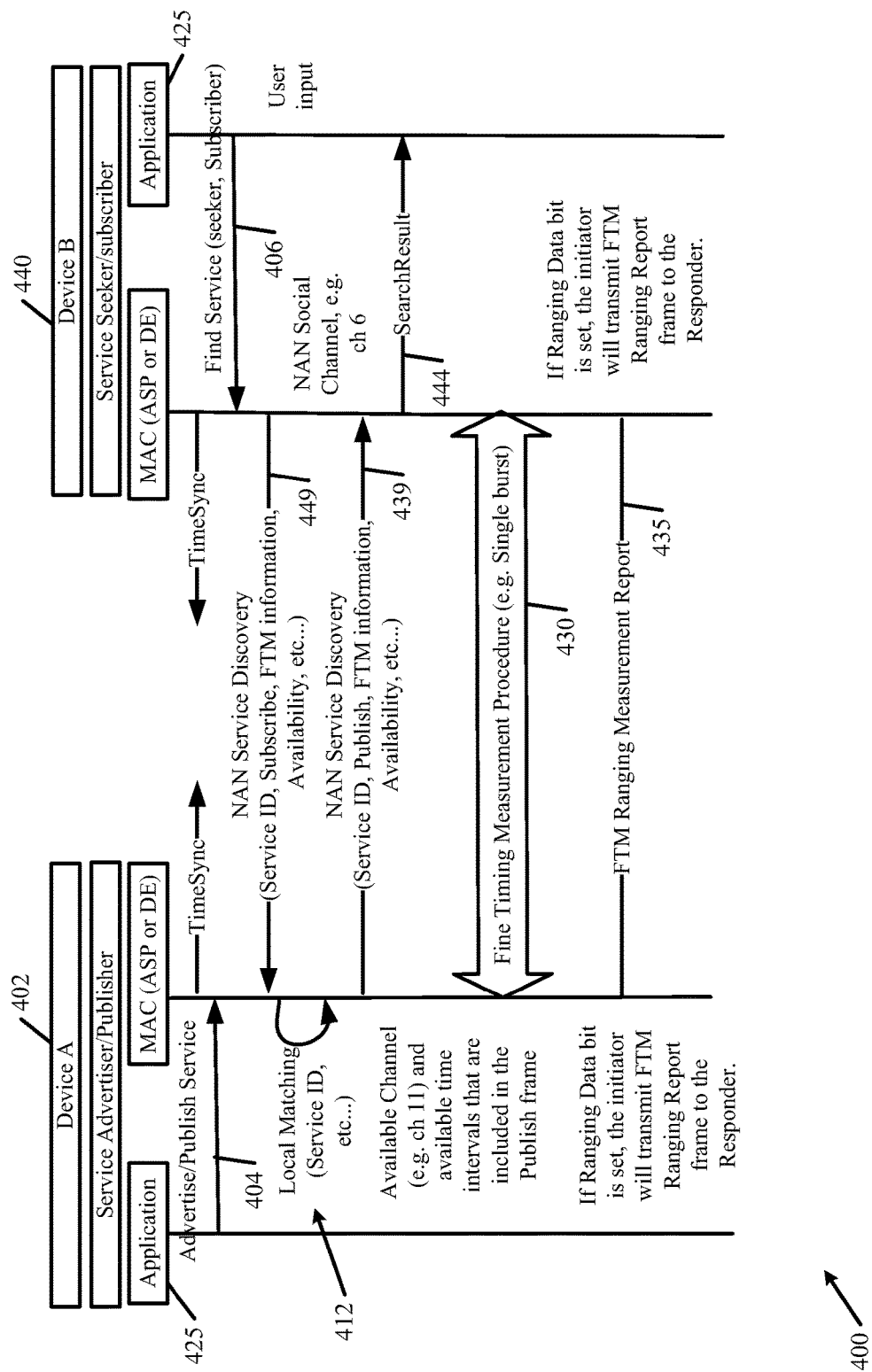
FIG. 4 is a sequence diagram of operations between a first wireless communication device and a second wireless communication device, in accordance with some demonstrative embodiments.

Reference is made to FIG. 4, which schematically illustrates a sequence 400 of operations between a first wireless communication device 402 and a second wireless communication device 440, in accordance with some demonstrative embodiments. For example, device 402 may perform the functionality of device 102 (FIG. 1) and/or device 440 may perform the functionality of device 140 (FIG. 1).

In some demonstrative embodiments, sequence 400 may include communication of a solicited publish frame, in response to a subscribe frame, e.g., as described below.

As shown in FIG. 4, device 402 may include an application 425, and/or device 440 may include an application 445. For example, application 425 may perform the functionality of application 125 (FIG. 1), and/or application 445 may perform the functionality of application 145 (FIG. 1).

As shown in FIG. 4, application 425 may advertise and/or publish (404) a service, which requires performing the FTM procedure. For example, application 425 may interact with a user of application 445, e.g., if the user is in proximity to device 402.

As shown in FIG. 4, application 445 may seek (406) the service, which requires performing the FTM procedure. For example, application 445 may interact with a user of application 425, e.g., if the user is in proximity to device 440.

As shown in FIG. 4, device 440 may transmit a NAN service discovery subscribe frame 449. For example NAN service discovery subscribe frame 449 may perform the functionality of subscribe frame 149 (FIG. 1).

As shown in FIG. 4, NAN service discovery subscribe frame 449 may include a service ID of the service, the ToF measurement information field, the availability information of device 440, and/or any other information relating to the service and/or the FTM measurement.

As shown in FIG. 4, device 402 may receive NAN service discovery subscribe frame 449.

As shown in FIG. 4, controller 124 (FIG. 1) may determine (412) one or more parameters of the FTM measurement, e.g., the initiator of the FTM measurement, the wireless channel, the time slot and/or any other parameters of the FTM measurement, while taking into account NAN service discovery subscribe frame 449.

As shown in FIG. 4, device 402 may transmit a NAN service discovery frame 439, e.g., in response to NAN service discovery subscribe frame 449. For example, NAN service discovery frame 439 may perform the functionality of discovery frame 139 (FIG. 1).

As shown in FIG. 4, NAN service discovery frame 439 may include a solicited publish frame, e.g., in response to NAN service discovery subscribe frame 449.

As shown in FIG. 4, NAN service discovery frame 439 may include a service ID of the service, the ToF measurement information field, the availability information of device 402, and/or any other information to the service and/or to the FTM measurement.

As shown in FIG. 4, device 440 may receive NAN service discovery frame 439, and may notify (444) application 445.

As shown in FIG. 4, after NAN service discovery frame 439 is received by device 440, devices 402 and/or 440 may perform an FTM procedure 430. For example, FTM procedure 430 may perform the functionality of FTM procedure 200 (FIG. 2).

In some demonstrative embodiments, devices 402 and/or 440 may perform FTM procedure 430, for example, according to the information in NAN service discovery frame 439, e.g., using available channel 11, the time intervals in the availability information and/or the like.

As shown in FIG. 4, once FTM procedure 430 is complete, the initiator of FTM procedure 430, e.g., as determined in the initiator indication of NAN service discovery frame 439, may communicate an FTM raging measurement report 435 with the responder, for example, if the report indication indicates the initiator is to send the FTM raging measurement report 435.

Figure 5:
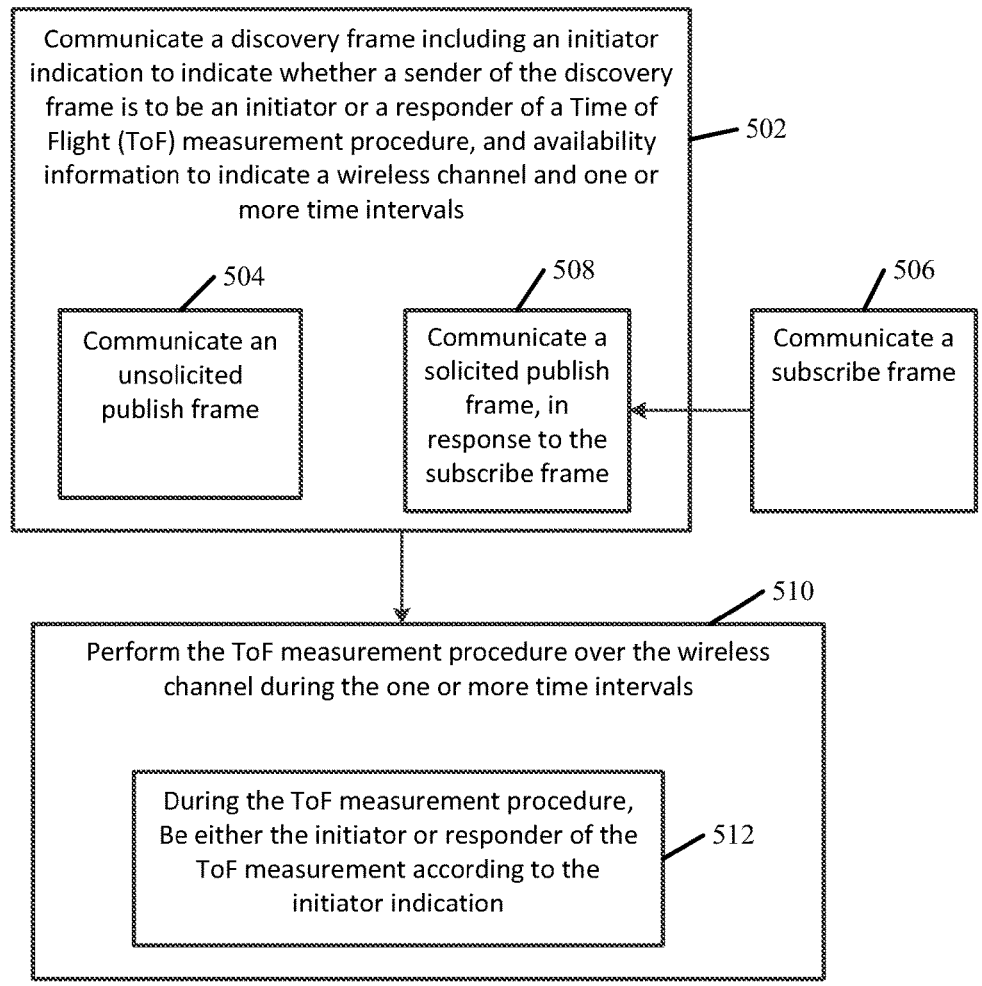
FIG. 5 is a schematic flow-chart illustration of a method of performing a Time of Flight (ToF) measurement, in accordance with some demonstrative embodiments.

Reference is made to FIG. 5, which schematically illustrates a method of performing a ToF measurement, in accordance with some demonstrative embodiments. For example, one or more of the operations of the method of FIG. 5 may be performed by a wireless communication system, e.g., system 100 (FIG. 1); a wireless communication device, e.g., devices 102 and/or 140 (FIG. 1); a controller, e.g., controllers 124 and/or 154 (FIG. 1); a radio, e.g., radios 114 and/or 144 (FIG. 1); a transmitter, e.g., transmitters 118 and/or 148 (FIG. 1); and/or a receiver, e.g., receivers 116 and/or 146 (FIG. 1).

In some demonstrative embodiments, the method of FIG. 5 may be performed at a first wireless communication device, e.g., device 102 (FIG. 1), for example, to coordinate the ToF measurement with a second wireless communication device, e.g. device 140 (FIG. 1).

As indicated at block 502, the method may include communicating a discovery frame including an initiator indication to indicate whether a sender of the discovery frame is to be an initiator or a responder of a Time of Flight (ToF) measurement procedure, and availability information to indicate a wireless channel and one or more time intervals. For example, devices 102 and/or 140 (FIG. 1) may communicate discovery frame 139 (FIG. 1) including the initiator indication and the availability information of device 102 (FIG. 1), e.g., as described above.

As indicated at block 504, in some demonstrative embodiments, communicating the discovery frame may include communicating an unsolicited publish frame. For example, devices 102 and/or 140 (FIG. 1) may communicate discovery frame 139 (FIG. 1) as an unsolicited publish frame, e.g., as described above.

In other embodiments, communicating the discovery frame may include communicating a solicited publish frame, in response to a subscribe frame, e.g., as described below with reference to blocks 506 and 508.

As indicated at block 506, the method may include communicating a subscribe frame. For example, devices 102 and/or 140 (FIG. 1) may communicate subscribe frame 149 (FIG. 1), e.g., as described above.

As indicated at block 508, communicating the discovery frame may include communicating a solicited publish frame in response to the subscribe frame. For example, devices 102 and/or 140 (FIG. 1) may communicate discovery frame 139 (FIG. 1) as a solicited publish frame in response to subscribe frame 149 (FIG. 1), e.g., as described above.

As indicated in block 510, the method may include performing the ToF measurement procedure over the wireless channel during the one or more time intervals. For example, devices 102 and/or 140 (FIG. 1) may perform the FTM procedure 200 (FIG. 2) over the wireless channel during the one or more time intervals, e.g., as described above.

As indicated in block 512, performing the ToF measurement procedure may include, during the ToF measurement procedure, being either the initiator or responder of the ToF measurement according to the initiator indication. For example, device 102 (FIG. 1) may be either the initiator or responder of the ToF measurement according to the initiator indication in discovery frame 139 (FIG. 1), e.g., as described above.

Figure 6:
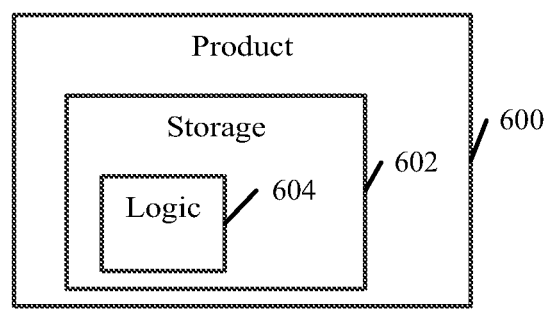
FIG. 6 is a schematic illustration of a product, in accordance with some demonstrative embodiments.

Reference is made to FIG. 6, which schematically illustrates a product of manufacture 600, in accordance with some demonstrative embodiments. Product 600 may include a non-transitory machine-readable storage medium 602 to store logic 604, which may be used, for example, to perform at least part of the functionality of devices 102 and/or 140 (FIG. 1), radios 114 and/or 144 (FIG. 1), transmitters 118 and/or 148 (FIG. 1), receivers 116 and/or 146 (FIG. 1), controllers 124 and/or 154 (FIG. 1), and/or to perform one or more operations of the method of FIG. 5. The phrase "non-transitory machine-readable medium" is directed to include all computer-readable media, with the sole exception being a transitory propagating signal.

In some demonstrative embodiments, product 600 and/or machine-readable storage medium 602 may include one or more types of computer-readable storage media capable of storing data, including volatile memory, non-volatile memory, removable or non-removable memory, erasable or non-erasable memory, writeable or re-writeable memory, and the like. For example, machine-readable storage medium 602 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 604 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

EXAMPLES

The following examples pertain to further embodiments.

Example 1 includes a first wireless device comprising a radio to communicate a discovery frame with a second wireless device, the discovery frame including an initiator indication to indicate whether a sender of the discovery frame is to be an initiator or a responder of a Time of Flight (ToF) measurement procedure, and availability information to indicate a wireless channel and one or more time intervals; and a controller to perform the ToF measurement procedure with the second wireless device over the wireless channel during the one or more time intervals, the controller to be either the initiator or responder of the ToF measurement according to the initiator indication.

Example 2 includes the subject matter of Example 1, and optionally, wherein the discovery frame includes capability information to indicate whether or not the sender of the discovery frame has at least one capability selected from the group consisting of an initiator capability, and a responder capability.

Example 3 includes the subject matter of Example 1 or 2, and optionally, wherein the discovery frame includes a report indication to indicate whether or not the initiator of the ToF measurement procedure is to send to the responder of the ToF measurement procedure a report of the ToF measurement procedure.

Example 4 includes the subject matter of any one of Examples 1-3, and optionally, wherein the discovery frame includes a ToF measurement information field including a first bit to indicate whether or not the sender of the discovery frame is capable of being the initiator of the ToF measurement procedure, a second bit to indicate whether or not the sender of the discovery frame is capable of being the responder of the ToF measurement procedure, a third bit including the initiator indication, and a fourth bit to indicate whether or not the initiator of the ToF measurement procedure is to send to the responder of the ToF measurement procedure a report of the ToF measurement procedure.

Example 5 includes the subject matter of any one of Examples 1-4, and optionally, wherein the discovery frame is an unsolicited publish frame.

Example 6 includes the subject matter of any one of Examples 1-5, and optionally, wherein the radio is to communicate a subscribe frame with the second wireless device, the discovery frame being a solicited publish frame in response to the subscribe frame.

Example 7 includes the subject matter of Example 6, and optionally, wherein the subscribe frame includes capability information to indicate whether or not a sender of the subscribe frame has at least one capability selected from the group consisting of an initiator capability, and a responder capability.

Example 8 includes the subject matter of Example 6 or 7, and optionally, wherein the subscribe frame includes preference information to indicate a preference of the sender of the subscribe frame to be the initiator of the ToF measurement procedure.

Example 9 includes the subject matter of any one of Examples 6-8, and optionally, wherein the subscribe frame includes a report indication to indicate whether or not the initiator of the ToF measurement procedure is to send to the responder of the ToF measurement procedure a report of the ToF measurement procedure.

Example 10 includes the subject matter of any one of Examples 6-9, and optionally, wherein the subscribe frame includes a ToF measurement information field including a first bit to indicate whether or not the sender of the subscribe frame is capable of being the initiator of the ToF measurement procedure, a second bit to indicate whether or not the sender of the subscribe frame is capable of being the responder of the ToF measurement procedure, a third bit to indicate a preference of the sender of the subscribe frame to be the initiator of the ToF measurement procedure, and a fourth bit to indicate whether or not the initiator of the ToF measurement procedure is to send to the responder of the ToF measurement procedure a report of the ToF measurement procedure.

Example 11 includes the subject matter of any one of Examples 1-10, and optionally, wherein the radio is to transmit the discovery frame to the second wireless device.

Example 12 includes the subject matter of any one of Examples 1-10, and optionally, wherein the radio is to receive the discovery frame from the second wireless device.

Example 13 includes the subject matter of any one of Examples 1-12, and optionally, wherein the ToF measurement procedure comprises a Fine Timing Measurement (FTM) procedure.

Example 14 includes the subject matter of any one of Examples 1-13, and optionally, wherein the radio is to communicate the discovery frame over a wireless communication channel over a 2.4 Gigahertz (GHz) frequency band or a 5 GHz frequency band.

Example 15 includes the subject matter of any one of Examples 1-14, and optionally, wherein the discovery frame is a Neighbor Awareness Networking (NAN) service discovery frame.

Example 16 includes a wireless communication system including a first wireless device, the first wireless device comprising one or more antennas; a memory; a processor; a radio to communicate a discovery frame with a second wireless device, the discovery frame including an initiator indication to indicate whether a sender of the discovery frame is to be an initiator or a responder of a Time of Flight (ToF) measurement procedure, and availability information to indicate a wireless channel and one or more time intervals; and a controller to perform the ToF measurement procedure with the second wireless device over the wireless channel during the one or more time intervals, the controller to be either the initiator or responder of the ToF measurement according to the initiator indication.

Example 17 includes the subject matter of Example 16, and optionally, wherein the discovery frame includes capability information to indicate whether or not the sender of the discovery frame has at least one capability selected from the group consisting of an initiator capability, and a responder capability.

Example 18 includes the subject matter of Example 16 or 17, and optionally, wherein the discovery frame includes a report indication to indicate whether or not the initiator of the ToF measurement procedure is to send to the responder of the ToF measurement procedure a report of the ToF measurement procedure.

Example 19 includes the subject matter of any one of Examples 16-18, and optionally, wherein the discovery frame includes a ToF measurement information field including a first bit to indicate whether or not the sender of the discovery frame is capable of being the initiator of the ToF measurement procedure, a second bit to indicate whether or not the sender of the discovery frame is capable of being the responder of the ToF measurement procedure, a third bit including the initiator indication, and a fourth bit to indicate whether or not the initiator of the ToF measurement procedure is to send to the responder of the ToF measurement procedure a report of the ToF measurement procedure.

Example 20 includes the subject matter of any one of Examples 16-19, and optionally, wherein the discovery frame is an unsolicited publish frame.

Example 21 includes the subject matter of any one of Examples 16-20, and optionally, wherein the radio is to communicate a subscribe frame with the second wireless device, the discovery frame being a solicited publish frame in response to the subscribe frame.

Example 22 includes the subject matter of Example 21, and optionally, wherein the subscribe frame includes capability information to indicate whether or not a sender of the subscribe frame has at least one capability selected from the group consisting of an initiator capability, and a responder capability.

Example 23 includes the subject matter of Example 21 or 22, and optionally, wherein the subscribe frame includes preference information to indicate a preference of the sender of the subscribe frame to be the initiator of the ToF measurement procedure.

Example 24 includes the subject matter of any one of Examples 21-23, and optionally, wherein the subscribe frame includes a report indication to indicate whether or not the initiator of the ToF measurement procedure is to send to the responder of the ToF measurement procedure a report of the ToF measurement procedure.

Example 25 includes the subject matter of any one of Examples 21-24, and optionally, wherein the subscribe frame includes a ToF measurement information field including a first bit to indicate whether or not the sender of the subscribe frame is capable of being the initiator of the ToF measurement procedure, a second bit to indicate whether or not the sender of the subscribe frame is capable of being the responder of the ToF measurement procedure, a third bit to indicate a preference of the sender of the subscribe frame to be the initiator of the ToF measurement procedure, and a fourth bit to indicate whether or not the initiator of the ToF measurement procedure is to send to the responder of the ToF measurement procedure a report of the ToF measurement procedure.

Example 26 includes the subject matter of any one of Examples 16-25, and optionally, wherein the radio is to transmit the discovery frame to the second wireless device.

Example 27 includes the subject matter of any one of Examples 16-25, and optionally, wherein the radio is to receive the discovery frame from the second wireless device.

Example 28 includes the subject matter of any one of Examples 16-27, and optionally, wherein the ToF measurement procedure comprises a Fine Timing Measurement (FTM) procedure.

Example 29 includes the subject matter of any one of Examples 16-28, and optionally, wherein the radio is to communicate the discovery frame over a wireless communication channel over a 2.4 Gigahertz (GHz) frequency band or a 5 GHz frequency band.

Example 30 includes the subject matter of any one of Examples 16-29, and optionally, wherein the discovery frame is a Neighbor Awareness Networking (NAN) service discovery frame.

Example 31 includes a method performed by a first wireless device, the method comprising communicating a discovery frame with a second wireless device, the discovery frame including an initiator indication to indicate whether a sender of the discovery frame is to be an initiator or a responder of a Time of Flight (ToF) measurement procedure, and availability information to indicate a wireless channel and one or more time intervals; and performing the ToF measurement procedure with the second wireless device over the wireless channel during the one or more time intervals, during the ToF measurement procedure being either the initiator or responder of the ToF measurement according to the initiator indication.

Example 32 includes the subject matter of Example 31, and optionally, wherein the discovery frame includes capability information to indicate whether or not the sender of the discovery frame has at least one capability selected from the group consisting of an initiator capability, and a responder capability.

Example 33 includes the subject matter of Example 31 or 32, and optionally, wherein the discovery frame includes a report indication to indicate whether or not the initiator of the ToF measurement procedure is to send to the responder of the ToF measurement procedure a report of the ToF measurement procedure.

Example 34 includes the subject matter of any one of Examples 31-33, and optionally, wherein the discovery frame includes a ToF measurement information field including a first bit to indicate whether or not the sender of the discovery frame is capable of being the initiator of the ToF measurement procedure, a second bit to indicate whether or not the sender of the discovery frame is capable of being the responder of the ToF measurement procedure, a third bit including the initiator indication, and a fourth bit to indicate whether or not the initiator of the ToF measurement procedure is to send to the responder of the ToF measurement procedure a report of the ToF measurement procedure.

Example 35 includes the subject matter of any one of Examples 31-34, and optionally, wherein the discovery frame is an unsolicited publish frame.

Example 36 includes the subject matter of any one of Examples 31-35, and optionally, comprising communicating a subscribe frame with the second wireless device, the discovery frame being a solicited publish frame in response to the subscribe frame.

Example 37 includes the subject matter of Example 36, and optionally, wherein the subscribe frame includes capability information to indicate whether or not a sender of the subscribe frame has at least one capability selected from the group consisting of an initiator capability, and a responder capability.

Example 38 includes the subject matter of Example 36 or 37, and optionally, wherein the subscribe frame includes preference information to indicate a preference of the sender of the subscribe frame to be the initiator of the ToF measurement procedure.

Example 39 includes the subject matter of any one of Examples 36-38, and optionally, wherein the subscribe frame includes a report indication to indicate whether or not the initiator of the ToF measurement procedure is to send to the responder of the ToF measurement procedure a report of the ToF measurement procedure.

Example 40 includes the subject matter of any one of Examples 36-39, and optionally, wherein the subscribe frame includes a ToF measurement information field including a first bit to indicate whether or not the sender of the subscribe frame is capable of being the initiator of the ToF measurement procedure, a second bit to indicate whether or not the sender of the subscribe frame is capable of being the responder of the ToF measurement procedure, a third bit to indicate a preference of the sender of the subscribe frame to be the initiator of the ToF measurement procedure, and a fourth bit to indicate whether or not the initiator of the ToF measurement procedure is to send to the responder of the ToF measurement procedure a report of the ToF measurement procedure.

Example 41 includes the subject matter of any one of Examples 31-40, and optionally, comprising transmitting the discovery frame to the second wireless device.

Example 42 includes the subject matter of any one of Examples 31-40, and optionally, comprising receiving the discovery frame from the second wireless device.

Example 43 includes the subject matter of any one of Examples 31-42, and optionally, wherein the ToF measurement procedure comprises a Fine Timing Measurement (FTM) procedure.

Example 44 includes the subject matter of any one of Examples 31-43, and optionally, comprising communicating the discovery frame over a wireless communication channel over a 2.4 Gigahertz (GHz) frequency band or a 5 GHz frequency band.

Example 45 includes the subject matter of any one of Examples 31-44, and optionally, wherein the discovery frame is a Neighbor Awareness Networking (NAN) service discovery frame.

Example 46 includes a product including one or more tangible computer-readable non-transitory storage media comprising computer-executable instructions operable to, when executed by at least one computer processor, enable the at least one computer processor to implement a method at a first wireless device, the method comprising communicating a discovery frame with a second wireless device, the discovery frame including an initiator indication to indicate whether a sender of the discovery frame is to be an initiator or a responder of a Time of Flight (ToF) measurement procedure, and availability information to indicate a wireless channel and one or more time intervals; and performing the ToF measurement procedure with the second wireless device over the wireless channel during the one or more time intervals, during the ToF measurement procedure being either the initiator or responder of the ToF measurement according to the initiator indication.

Example 47 includes the subject matter of Example 46, and optionally, wherein the discovery frame includes capability information to indicate whether or not the sender of the discovery frame has at least one capability selected from the group consisting of an initiator capability, and a responder capability.

Example 48 includes the subject matter of Example 46 or 47, and optionally, wherein the discovery frame includes a report indication to indicate whether or not the initiator of the ToF measurement procedure is to send to the responder of the ToF measurement procedure a report of the ToF measurement procedure.

Example 49 includes the subject matter of any one of Examples 46-48, and optionally, wherein the discovery frame includes a ToF measurement information field including a first bit to indicate whether or not the sender of the discovery frame is capable of being the initiator of the ToF measurement procedure, a second bit to indicate whether or not the sender of the discovery frame is capable of being the responder of the ToF measurement procedure, a third bit including the initiator indication, and a fourth bit to indicate whether or not the initiator of the ToF measurement procedure is to send to the responder of the ToF measurement procedure a report of the ToF measurement procedure.

Example 50 includes the subject matter of any one of Examples 46-49, and optionally, wherein the discovery frame is an unsolicited publish frame.

Example 51 includes the subject matter of any one of Examples 46-50, and optionally, wherein the method comprises communicating a subscribe frame with the second wireless device, the discovery frame being a solicited publish frame in response to the subscribe frame.

Example 52 includes the subject matter of Example 51, and optionally, wherein the subscribe frame includes capability information to indicate whether or not a sender of the subscribe frame has at least one capability selected from the group consisting of an initiator capability, and a responder capability.

Example 53 includes the subject matter of Example 51 or 52, and optionally, wherein the subscribe frame includes preference information to indicate a preference of the sender of the subscribe frame to be the initiator of the ToF measurement procedure.

Example 54 includes the subject matter of any one of Examples 51-53, and optionally, wherein the subscribe frame includes a report indication to indicate whether or not the initiator of the ToF measurement procedure is to send to the responder of the ToF measurement procedure a report of the ToF measurement procedure.

Example 55 includes the subject matter of any one of Examples 51-54, and optionally, wherein the subscribe frame includes a ToF measurement information field including a first bit to indicate whether or not the sender of the subscribe frame is capable of being the initiator of the ToF measurement procedure, a second bit to indicate whether or not the sender of the subscribe frame is capable of being the responder of the ToF measurement procedure, a third bit to indicate a preference of the sender of the subscribe frame to be the initiator of the ToF measurement procedure, and a fourth bit to indicate whether or not the initiator of the ToF measurement procedure is to send to the responder of the ToF measurement procedure a report of the ToF measurement procedure.

Example 56 includes the subject matter of any one of Examples 46-55, and optionally, wherein the method comprises transmitting the discovery frame to the second wireless device.

Example 57 includes the subject matter of any one of Examples 46-55, and optionally, wherein the method comprises receiving the discovery frame from the second wireless device.

Example 58 includes the subject matter of any one of Examples 46-57, and optionally, wherein the ToF measurement procedure comprises a Fine Timing Measurement (FTM) procedure.

Example 59 includes the subject matter of any one of Examples 46-58, and optionally, wherein the method comprises communicating the discovery frame over a wireless communication channel over a 2.4 Gigahertz (GHz) frequency band or a 5 GHz frequency band.

Example 60 includes the subject matter of any one of Examples 46-59, and optionally, wherein the discovery frame is a Neighbor Awareness Networking (NAN) service discovery frame.

Example 61 includes an apparatus comprising means for communicating at a first wireless device a discovery frame with a second wireless device, the discovery frame including an initiator indication to indicate whether a sender of the discovery frame is to be an initiator or a responder of a Time of Flight (ToF) measurement procedure, and availability information to indicate a wireless channel and one or more time intervals; and means for performing the ToF measurement procedure with the second wireless device over the wireless channel during the one or more time intervals, during the ToF measurement procedure being either the initiator or responder of the ToF measurement according to the initiator indication.

Example 62 includes the subject matter of Example 61, and optionally, wherein the discovery frame includes capability information to indicate whether or not the sender of the discovery frame has at least one capability selected from the group consisting of an initiator capability, and a responder capability.

Example 63 includes the subject matter of Example 61 or 62, and optionally, wherein the discovery frame includes a report indication to indicate whether or not the initiator of the ToF measurement procedure is to send to the responder of the ToF measurement procedure a report of the ToF measurement procedure.

Example 64 includes the subject matter of any one of Examples 61-63, and optionally, wherein the discovery frame includes a ToF measurement information field including a first bit to indicate whether or not the sender of the discovery frame is capable of being the initiator of the ToF measurement procedure, a second bit to indicate whether or not the sender of the discovery frame is capable of being the responder of the ToF measurement procedure, a third bit including the initiator indication, and a fourth bit to indicate whether or not the initiator of the ToF measurement procedure is to send to the responder of the ToF measurement procedure a report of the ToF measurement procedure.

Example 65 includes the subject matter of any one of Examples 61-64, and optionally, wherein the discovery frame is an unsolicited publish frame.

Example 66 includes the subject matter of any one of Examples 61-65, and optionally, comprising means for communicating a subscribe frame with the second wireless device, the discovery frame being a solicited publish frame in response to the subscribe frame.

Example 67 includes the subject matter of Example 66, and optionally, wherein the subscribe frame includes capability information to indicate whether or not a sender of the subscribe frame has at least one capability selected from the group consisting of an initiator capability, and a responder capability.

Example 68 includes the subject matter of Example 66 or 67, and optionally, wherein the subscribe frame includes preference information to indicate a preference of the sender of the subscribe frame to be the initiator of the ToF measurement procedure.

Example 69 includes the subject matter of any one of Examples 66-68, and optionally, wherein the subscribe frame includes a report indication to indicate whether or not the initiator of the ToF measurement procedure is to send to the responder of the ToF measurement procedure a report of the ToF measurement procedure.

Example 70 includes the subject matter of any one of Examples 66-69, and optionally, wherein the subscribe frame includes a ToF measurement information field including a first bit to indicate whether or not the sender of the subscribe frame is capable of being the initiator of the ToF measurement procedure, a second bit to indicate whether or not the sender of the subscribe frame is capable of being the responder of the ToF measurement procedure, a third bit to indicate a preference of the sender of the subscribe frame to be the initiator of the ToF measurement procedure, and a fourth bit to indicate whether or not the initiator of the ToF measurement procedure is to send to the responder of the ToF measurement procedure a report of the ToF measurement procedure.

Example 71 includes the subject matter of any one of Examples 61-70, and optionally, comprising means for transmitting the discovery frame to the second wireless device.

Example 72 includes the subject matter of any one of Examples 61-70, and optionally, comprising means for receiving the discovery frame from the second wireless device.

Example 73 includes the subject matter of any one of Examples 61-72, and optionally, wherein the ToF measurement procedure comprises a Fine Timing Measurement (FTM) procedure.

Example 74 includes the subject matter of any one of Examples 61-73, and optionally, comprising means for communicating the discovery frame over a wireless communication channel over a 2.4 Gigahertz (GHz) frequency band or a 5 GHz frequency band.

Example 75 includes the subject matter of any one of Examples 61-74, and optionally, wherein the discovery frame is a Neighbor Awareness Networking (NAN) service discovery frame.

Functions, operations, components and/or features described herein with reference to one or more embodiments, may be combined with, or may be utilized in combination with, one or more other functions, operations, components and/or features described herein with reference to one or more other embodiments, or vice versa.

While certain features of have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:
1. An apparatus comprising:
  a memory; and
  a processor configured to cause a first Neighbor Awareness Networking (NAN) device to:

transmit a first NAN frame to a second NAN device to indicate that the first NAN device is to perform a role of an initiator and that the second NAN device is to perform a role of a responder of a Fine Timing Measurement (FTM) procedure;

receive a second NAN frame from the second NAN device, the second NAN frame comprising a ranging report bit to indicate whether or not the initiator is required to send to the responder a ranging report based on the FTM procedure;

perform the FTM procedure with the second NAN device; and select whether or not to transmit the ranging report to the responder based on the ranging report bit.

2. The apparatus of claim 1 configured to cause the first NAN device to select to transmit the ranging report to the responder when the ranging report bit comprises a predefined bit value to indicate that the initiator is required to send the ranging report to the responder.

3. The apparatus of claim 2, wherein the predefined bit value is "1".

4. The apparatus of claim 1, wherein the ranging report comprises a Basic Service Set ID (BSSID) field, the BSSID field comprising a Medium Access Control (MAC) address of the responder.

5. The apparatus of claim 1, wherein the first NAN frame comprises availability information to indicate one or more time intervals to perform the FTM procedure.

6. The apparatus of claim 1, wherein the second NAN frame comprises availability information to indicate one or more time intervals to perform the FTM procedure.

7. The apparatus of claim 1 configured to cause the first NAN device to transmit a NAN Service Discovery Frame (SDF) comprising capability information to indicate that the first NAN device has both an initiator capability and a responder capability of the FTM procedure.

8. The apparatus of claim 1 configured to cause the first NAN device to have both an initiator capability and a responder capability of the FTM procedure.

9. The apparatus of claim 1, wherein the FTM procedure comprises a single burst FTM procedure.

10. The apparatus of claim 1 configured to cause the first NAN device to perform the FTM procedure by transmitting an FTM request to the responder, receiving from the responder an acknowledgement (Ack), and exchanging one or more message sequences with the responder, a message sequence of the one or more message sequences comprises an FTM message from the responder to the initiator, and an Ack from the initiator to the responder.

11. The apparatus of claim 1 comprising a radio.

12. The apparatus of claim 1 comprising one or more antennas.

13. A product comprising one or more tangible computer-readable non-transitory storage media comprising computer-executable instructions operable to, when executed by at least one processor, enable the at least one processor to cause a first Neighbor Awareness Networking (NAN) device to:

transmit a first NAN frame to a second NAN device to indicate that the first NAN device is to perform a role of an initiator and that the second NAN device is to perform a role of a responder of a Fine Timing Measurement (FTM) procedure;

receive a second NAN frame from the second NAN device, the second NAN frame comprising a ranging report bit to indicate whether or not the initiator is required to send to the responder a ranging report based on the FTM procedure;

perform the FTM procedure with the second NAN device; and select whether or not to transmit the ranging report to the responder based on the ranging report bit.

14. The product of claim 13, wherein the instructions, when executed, cause the first NAN device to select to transmit the ranging report to the responder when the ranging report bit comprises a predefined bit value to indicate that the initiator is required to send the ranging report to the responder.

15. The product of claim 13, wherein the ranging report comprises a Basic Service Set ID (BSSID) field, the BSSID field comprising a Medium Access Control (MAC) address of the responder.

16. The product of claim 13, wherein the first NAN frame comprises availability information to indicate one or more time intervals to perform the FTM procedure.

17. The product of claim 13, wherein the instructions, when executed, cause the first NAN device to transmit a NAN Service Discovery Frame (SDF) comprising capability information to indicate that the first NAN device has both an initiator capability and a responder capability of the FTM procedure.

18. The product of claim 13, wherein the instructions, when executed, cause the first NAN device to perform the FTM procedure by transmitting an FTM request to the responder, receiving from the responder an acknowledgement (Ack), and exchanging one or more message sequences with the responder, a message sequence of the one or more message sequences comprises an FTM message from the responder to the initiator, and an Ack from the initiator to the responder.

19. An apparatus comprising:

means for causing a first Neighbor Awareness Networking (NAN) device to transmit a first NAN frame to a second NAN device to indicate that the first NAN device is to perform a role of an initiator and that the second NAN device is to perform a role of a responder of a Fine Timing Measurement (FTM) procedure;

means for causing the first NAN device to receive a second NAN frame from the second NAN device, the second NAN frame comprising a ranging report bit to indicate whether or not the initiator is required to send to the responder a ranging report based on the FTM procedure;

means for causing the first NAN device to perform the FTM procedure with the second NAN device; and means for causing the first NAN device to select whether or not to transmit the ranging report to the responder based on the ranging report bit.

20. The apparatus of claim 19 comprising means for selecting to cause the first NAN device to transmit the ranging report to the responder when the ranging report bit comprises a predefined bit value to indicate that the initiator is required to send the ranging report to the responder.

* * * * *